United States Patent [19]
Kato et al.

[11] 3,959,009
[45] May 25, 1976

[54] METHOD FOR CONTINUOUSLY PURIFYING PULLULAN

[75] Inventors: Koso Kato; Tatsuo Nomura, both of Okayama, Japan

[73] Assignee: Kabushiki Kaisha Hayashibara Seibutsukagaku Kenkyujo, Okayama, Japan

[22] Filed: Feb. 14, 1975

[21] Appl. No.: 550,028

[30] Foreign Application Priority Data
Feb. 23, 1974 Japan................................ 49-21783

[52] U.S. Cl................................ 127/34; 195/31 R; 195/31 P; 195/119; 260/209 R; 423/658.5
[51] Int. Cl.²...................... C12D 13/04; C13L 3/00
[58] Field of Search............... 195/31 P, 31 R, 119; 127/29, 34; 260/209 R; 423/658.5

[56] References Cited
UNITED STATES PATENTS
3,827,937   8/1974   Kato .................................. 195/31 P
3,870,537   3/1975   Hijiya........................... 195/31 R X Primary Examiner—Morris O. Wolk
Assistant Examiner—Sidney Marantz
Attorney, Agent, or Firm—Browdy and Neimark

[57] ABSTRACT

A continuous method for purifying pullulan characterized in that two or more tanks containing aqueous solvent solutions of different concentrations are installed in a series wherein the solvent concentrations are always kept lower than the one following, and comprising successively ejecting an aqueous pullulan solution into the first tank to form a mixture wherein pullulan particles are suspended keeping the aqueous solvent solution constantly at a higher concentration than that necessary for precipitating the pullulan particles, separating the pullulan particle suspension from the mixture, transferring the separated pullulan particle suspension into an adjoining tank, repeating such steps, at least once, to dehydrate the pullulan particles and then successively recovering the dehydrated pullulan in a power form from the last tank.

4 Claims, 1 Drawing Figure

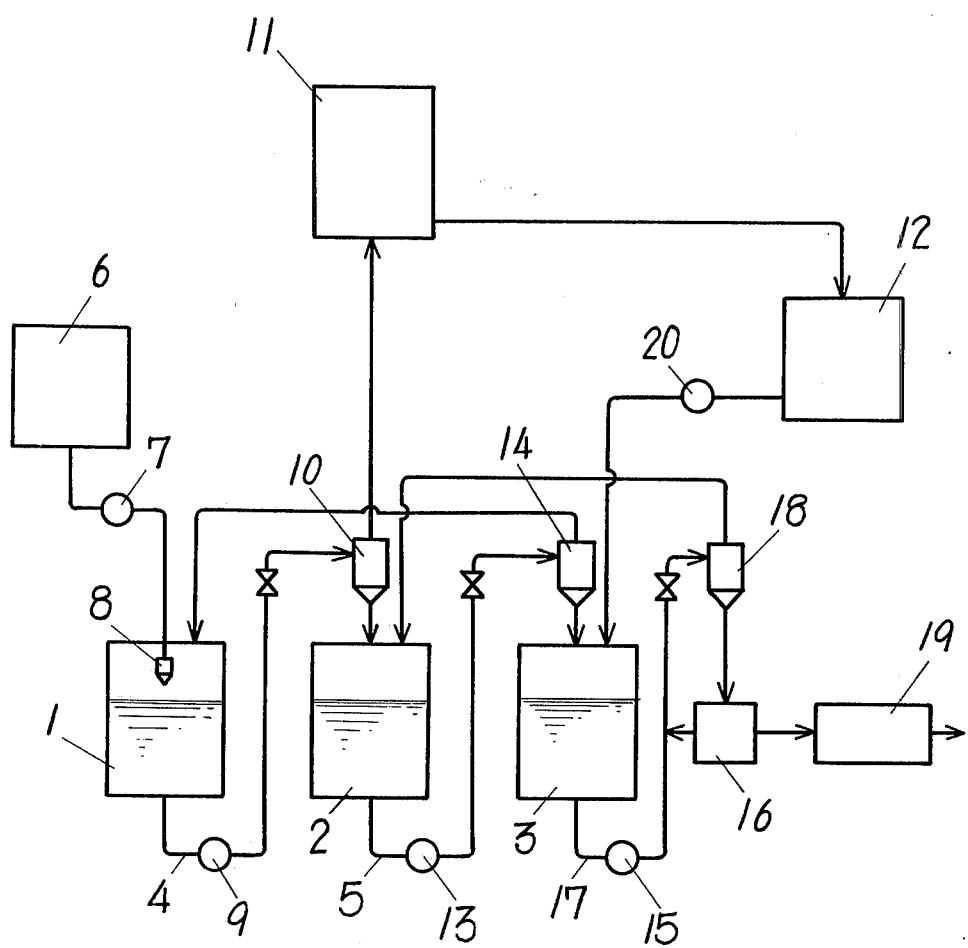

METHOD FOR CONTINUOUSLY PURIFYING PULLULAN

The present invention relates to a method for continuously purifying pullulan.

Methods for producing pullulan were reported by H. Bender et al., Biochim. Biophys. Acta, 36, 301–316 (1959), Seinosuke Uedia, Journal of the Chemical Society of Japan, Industrial Chemistry Section, 67, 757–760 (1960), and others. In these methods, pullulan is produced and purified by the steps comprising cultivating a strain of *Aureobasidium pullulans* in a liquid medium, subjecting the obtained pullulan-containing culture broth to procedures such as centrifugal separation to remove the cells, then decoloring the supernatant and subsequently adding thereto an organic solvent in which pullulan is not soluble (hereinafter referred to as solvent) such as methanol, ethanol and acetone to precipitate and separate the pullulan. However, the pullulan precipitate obtained by such methods still contains 40–60% (w/w) of water, even if the solvent is added to the pullulan-containing culture broth in two to three volumes against the broth, and the impurities, i.e. residual sugars such as mono- and oligosaccharides, pigments, proteins and inorganic salts present in the pullulan precipitate can not be removed by drying the precipitate per se. Further, the necessary additional purification and dehydration of the precipitate result in a larger consumption of anhydrous solvent, eventually increasing the production cost. In addition, the pullulan precipitate, containing 40–60% (w/w) of water, occasionally coheres to form a sticky mass, subsequent treatment of which being difficult.

The present invention provides a method to obtain high-purity pullulan characterized by successive continuous purification steps, prevention of the pullulan precipitate from forming into coherent and sticky masses, and easy realization of a substantial reduction in solvent consumption.

Now the method of the invention will be illustrated in detail with reference to a typical example and the accompanying drawing. According to the method, an aqueous pullulan solution obtained by cultivating a pullulan-producing strain in a liquid medium and removing the cells from the resulting broth (hereinafter referred to as pullulan solution) is fed to a solution of solvent in water (hereinafter referred to as solvent solution) in a manner that a mixture, wherein extremely-fine particles of pullulan are homogeneously suspended, is obtained, and transferring the mixture to an adjoining tank which contains the same solvent solution but of a higher concentration (i.e., more solvent in the water), and then repeating such steps, at least once, to obtain a nearly-anhydrous pullulan product with a much higher purity and in a powder form. The method prevents the pullulan particles from forming into coherent and sticky masses, and automatizes the production of pullulan.

In order to prevent dilution of the solvent solutions in pullulan purification tanks, usually additional solvents are supplemented to maintain the desired concentrations. To the contrary, the present invention is characterized in that the amount of solvent used can be reduced by charging a solvent solution with a high concentration into the tank where the dilution rate of solvent solution by feeding pullulan solution is the lowest and subsequently transferring the solvent solution to the adjoining tank where the dilution rate is higher. Thus purification of pullulan can be attained with ease as well as with a reduced amount of solvent.

In the drawing, the single figure is a schematic view of an apparatus for successively purifying pullulan given as a preferred embodiment of the present invention.

The invention will be illustrated hereinafter in detail with reference to the accompanying drawing. Pullulan purification tanks 1 to 3 are installed in a series and connected by pipelines 4 and 5 which go down from tank 1 or 2 and up to tank 2 or 3. The respective tanks contain solvent solutions of different concentrations in the increasing order. More particularly, the solvent concentration in tank 1 is slightly higher than the minimum necessary to precipitate pullulan, for example higher than 70% (v/v), while that in tank 2 is higher than that in tank 1 but lower than that in tank 3 which is sufficient so that an equilibrium can be maintained with pullulan having a moisture content of several percents; thus the concentration of each tank is always kept lower than the one following. The solvent content of each tank may be as low as the minimum amount to dehydrate pullulan. However, since the period to remove water and impurities varies in proportion to the size of pullulan particle, the largest possible amount is preferable for assurance. In general, the amount is determined by the tank capacity. The retention time of the pullulan particles in tanks 1, 2 and 3 averages from about 10 to 60 minutes.

Tank 6 is a storage tank which holds the pullulan solution and from which the pullulan solution is ejected into tank 1 by pump 7. An ejection of pullulan solution in a fine mist expedites the purification and suspension of the pullulan in the solvent and prevents the pullulan from forming into masses by cohering and sticking. Accordingly, it is preferable to eject the pullulan solution in a fine mist into the solvent by spraying it through a high pressure nozzle 8 or by charging with a rotary disk, with vigorous and continuous agitation of the solvent solution in tank 1. Further, the ejection of a pullulan solution with a concentration as high as possible, but preferably not higher than 40% (w/v), in a fine mist with keeping the solution temperature lower than 200°C is very effective for the purification of pullulan. The pullulan solution thus ejected into tank 1 suspends to form fine particles when exposed to the solvent solution. The suspended pullulan particles have a moisture content close to that of the solvent solution.

Pump 9 attached to pipeline 4, which goes down from tank 1 and up to tank 2, serves as a means to transfer the mixture, i.e. the pullulan suspension, from tank 1 to tank 2. Hydrocyclone 10 attached to pipeline 4 serves as a means to separate the mixture into a solvent solution fraction and a concentrated pullulan suspension fraction and simultaneously charge the latter fraction into tank 2. Pullulan particles present in the suspension which is charged into tank 2 are freed from the impurities and dehydrated by the solvent solution with a higher concentration that that in tank 1 to form a mixture wherein the resulting pullulan particles are suspended. The separated solvent solution is transferred into solvent distillation column 11 where it is distilled. The concentrated solvent solution is then transferred into solvent storage tank 12.

Pump 13 attached to pipeline 5, which goes down from tank 2 and up to tank 3, serves as a means to transfer the mixture obtained in tank 2 to tank 3. Hydrocyclone 14 attached to pipeline 5 serves as a means to separate the mixture into a solvent solution fraction and a further concentrated pullulan suspension fraction and simultaneously charge the latter fraction into tank 3. Pullulan particles present in the suspension charged into tank 3 are freed from the impurities and dehydrated to a moisture content of several percent by the solvent solution with the highest concentration of those in the three tanks to form a mixture wherein the resulting non-viscous pullulan particles are suspended. The separated solvent solution is returned into tank 1 to prevent dilution of the solvent solution in the tank by the feeding of pullulan solution.

Pump 15 attached to pipeline 17 serves as a means to transfer the mixture obtained in tank 3 into explosion-proof-type centrifuge 16 via pipeline 17. Hydrocyclone 18 attached to pipeline 17 serves as a means to separate the mixture transferred from tank 3 into a solvent solution fraction and a further-concentrated pullulan suspension fraction and simultaneously charge the latter fraction into explosion-proof-type centrifuge 16.

The solvent solution portion in the pullulan suspension is then separated with explosion-proof-type centrifuge 16 to yield the pullulan precipitate. A pullulan product in a powder form can be obtained by drying the pullulan precipitate in vacuum dryer 19. The solvent solution discharged from hydrocyclone 18 and explosion-proof-type centrifuge 16 is transferred into tank 2 to prevent dilution of the solvent solution in the tank by the feeding of pullulan solution. Pump 20 serves as a means to transfer the concentrated solvent solution from solvent storage tank 12 into tank 3 to prevent dilution of the solvent solution in the tank by the feeding of pullulan solution.

In the above system, the total amount of solvent and pullulan solutions charged thereto is kept at an equivalent to the total amount of the solvent solution discharged from hydrocyclone 10 and the pullulan product obtained from vacuum dryer 19. The contents of tanks 1, 2 and 3 are kept respectively at constant levels by adjusting the feedings to hydrocyclones 10, 14 and 18.

Freely or partially water-soluble solvents incapable of dissolving pullulan, such as alcohols, ketones, esters, ethers, etc. may be used in the present invention. More particularly, employable solvents include methanol, ethanol, propanol, isopropanol, n-butyl alcohol, sec-butyl alcohol, methyl acetate, tetrahydrofuran, dioxane, ethylene glycol monoethyl ether, ethylene glycol monobutyl ether, diethylene glycol monomethyl ether, methyl ethyl ketone, diacetone alcohol and acetylacetone.

With the employment of these solvents at the minimum concentration necessary for precipitating pullulan, the solvent used can be reduced to a significantly lower amount in comparison with that required for a batch-type process and, moreover, a nearly-anhydrous powdered pullulan product with a much higher purity is obtainable.

Another advantage of the present invention is that pullulan particles can be suspended, even if a liquid layer of pullulan is formed in a tank which contains a lower concentration of solvent and does not adhere to the internal wall of the tank, by charging the liquid layer of pullulan in a fine mist into the next tank.

A further advantage of the present invention is that the same result as above can be attained, even if two to three layers such as aqueous pullulan solution, water-containing solvent and solvent-containing water are formed when a partially-water-soluble solvent is used, by sufficiently agitating these layers.

The pullulan purification tanks in the present invention should be a set of two or more, preferably three or four, but sets of five or more are disadvantageous from view of industrial practice.

The present invention will be illustrated hereinafter in detail by way of a non-limiting example.

EXAMPLE

The seed culture of Aureobasidium pullulans IFO 4464 was carried out by inoculating said strain on a sterilized and cooled liquid medium comprising 10% (w/v) acid-converted starch syrup with a D.E. (dextrose equivalent) of 45, 0.2% (w/v) $K_2HPO_4$, 0.2% (w/v) peptone, 0.2% (w/v) NaCl, 0.04% (w/v) $MgSO_4 \cdot 7H_2O$ and 0.001% (w/v) $FeSO_4 \cdot 7H_2O$, and incubating the resultant at 27°C under aerobic conditions for 26 hours. The main culture was carried out by inoculating the seed culture broth on a medium with the same composition as above and incubating the resultant under the same conditions for four days. After removing the cells, the resulting broth is vacuum-evaporated at 60°C to yield a pullulan solution with a pullulan content of 21% (w/v).

The thus obtained pullulan solution is charged into pullulan solution tank 6 referred to in the drawing. Tanks 1, 2 and 3 have respective capacities of 1,300z and a 1,000z aliquot of aqueous methanol solution is charged into each tank to obtain a depth of 2,000 mm. In tank 1 the methanol concentration is adjusted to 80% (v/v), tank 2 90% (v/v) and tank 3 97% (v/v).

The pullulan solution in tank 6 is instantly heated to 175°C at a pressure of 150 kg/cm² and fed to the surface of methanol solution in tank 1 with spraying from high pressure nozzle 8 at a flow rate of 200 z/hr. The thus obtained mixtures, wherein pullulan particles are suspended in tanks 1, 2 and 3, are respectively transferred at each flow rate of 6,000 z/hr by pumps 9, 13 and 15. The methanol solution with a concentration of 99% (v/v) in solvent storage tank 12 is charged at a flow rate of 800 z/hr into tank 3. The methanol solution in tank 1 is transferred into solvent distillation column 11 via hydrocyclone 10 at a flow rate of 900 z/hr. The amounts of methanol solutions in tanks 2 or 3 are maintained at constant levels by supplements via hydrocyclones 14 or 18. The pullulan precipitate discharged from explosion-proof-type centrifuge 16 is dried at 60°C, 680 mm/Hg by rotary vacuum drier 19 to yield a pullulan product and the methanol vapor is recovered by a condenser.

Thus, the pullulan product in a colorless powdered form with a moisture content of about 5% and a residual sugar content of 0.1% was obtained at a rate of 4.2 kg/hr.

What we claim is:

1. A continuous method for the purification of pullulan using a series of at least two liquids, each liquid comprising a solution in water of organic solvent incapable of dissolving pullulan, wherein the concentration of said organic solvent in each of said liquids is higher than the minimum necessary to precipitate pullulan and said concentration increases in each successive liquid in said series, comprising:
   introducing an aqueous pullulan solution into the first of said series of liquids to precipitate pullulan particles in the liquid and form a mixture in which pullulan particles are suspended;

separating the pullulan particle suspension from the mixture in each liquid of said series which contains such a mixture, except for the last liquid of said series;

transferring each pullulan particle suspension separated from the liquid in said separating step into the liquid in said series immediately succeeding that liquid from which each pullulan particle suspension being separated comes, whereby the pullulan particles are dehydrated and purified; and recovering the dehydrated pullulan in powder form from the last liquid of said series.

2. A method in accordance with claim 1 wherein said solvent is selected from the group consisting of methanol, ethanol, propanol, isopropanol, n-butyl alcohol, sec-butyl alcohol, methyl acetate, tetrahydrofuran, dioxane, ethylene glycol monoethyl ether, ethylene glycol monobutyl ether, diethylene monomethyl ether, methyl ethyl ketone, diacetone alcohol and acetylacetone.

3. A method in accordance with claim 1 further including the steps of returning the solution separated from the pullulan particle suspension in said separating step of the liquid immediately preceding that liquid from which the pullulan being separated comes, except for that coming from said first liquid of said series, concentrating the solution separated from the pullulan particle suspension from the pullulan particle suspension coming from said first liquid, and feeding the concentrated solution to the last liquid of said series.

4. A method in accordance with claim 1 wherein said series of liquids includes at least three liquids.

* * * * *